United States Patent

[11] 3,629,673

| [72] | Inventor | Kjeld Thorborg<br>Vasteras, Sweden |
| --- | --- | --- |
| [21] | Appl. No. | 64,447 |
| [22] | Filed | Aug. 17, 1970 |
| [45] | Patented | Dec. 21, 1971 |
| [73] | Assignee | Allmanna Svenska Elektriska Aktiebolaget<br>Vasteras, Sweden |
| [32] | Priority | Sept. 1, 1969 |
| [33] |  | Sweden |
| [31] |  | 12045/69 |

[54] DIRECT CURRENT CONVERTOR FOR DC SUPPLY WITH EXTINGUISHING CIRCUIT
3 Claims, 2 Drawing Figs.

[52] U.S. Cl. .................................................. 321/45 C,
307/252 M
[51] Int. Cl. .................................................. H02m 7/52
[50] Field of Search .................................................. 323/225 C;
307/252 M; 321/5, 43, 44, 45 R, 45 C

[56] References Cited
UNITED STATES PATENTS

| 3,454,863 | 7/1969 | Hintz et al. ..................... | 321/44 |
| --- | --- | --- | --- |
| 3,406,325 | 10/1968 | Rosa ............................. | 321/5 |
| 3,360,709 | 12/1967 | Etter ............................ | 321/5 |
| 3,242,352 | 3/1966 | Long ............................ | 321/45 C |
| 3,354,322 | 11/1967 | Eastop .......................... | 307/252 M |

Primary Examiner—A. D. Pellinen
Attorney—Jennings Bailey, Jr.

ABSTRACT: A DC converter for controlling the average value of an intermittent direct current comprises a main thyristor which is ignited with a certain frequency and provided with an extinguishing circuit having an auxiliary thyristor, the ignition of which causes the extinction of the main thyristor. The extinguishing circuit further comprises an oscillating circuit which includes a reactor and a capacitor, which reactor is in series with the main thyristor as well as the auxiliary thyristor.

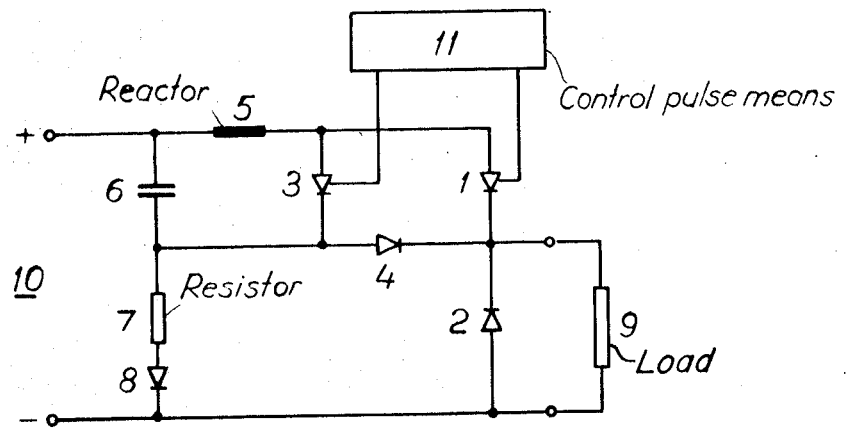
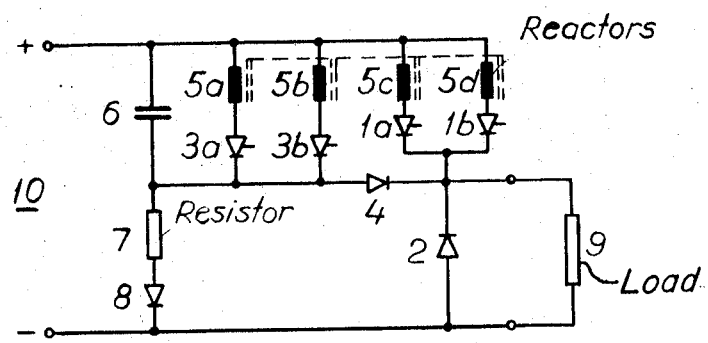

DIRECT CURRENT CONVERTER FOR DC SUPPLY WITH EXTINGUISHING CIRCUIT

BACKGROUND OF THE INVENTION

1. Field of the Invention

The present invention relates to a thyristor-regulator for direct current supply. The thyristor regulator is of the type comprising a main thyristor in series with a load and an extinguishing circuit for the main thyristor in the form of an oscillating circuit which is started with the help of an auxiliary thyristor.

2. The Prior Art

The regulator is thus of the type known as a "DC converter." It operates with a main thyristor which is made conducting by a control pulse-emitter and is extinguished with the help of an extinguishing circuit which is activated by making the auxiliary thyristor conducting.

SUMMARY OF THE INVENTION

The thyristor-regulator according to the invention is characterized in that it may comprise only two thyristors and one reactor, which also serves as current derivative protection for the thyristors in all stages of the operating cycle of the regulator. The thyristor-regulator is specifically characterized in that said reactor is connected so that its inductance is mutual for the load current through the main thyristor and the recharging current of the capacitor through the auxiliary thyristor.

BRIEF DESCRIPTION OF THE DRAWINGS

The invention will be further described with reference to the accompanying drawings where FIG. 1 shows a thyristor-regulator and FIG. 2 shows a modified form thereof according to the invention.

DESCRIPTION OF THE PREFERRED EMBODIMENTS

FIG. 1 shows a load 9 fed from a direct voltage source 10 through the main thyristor 1. The main thyristor 1 can be extinguished by an extinguishing circuit comprising an oscillating circuit containing a capacitor 6 and a reactor 5. The oscillating circuit is activated by means of the auxiliary thyristor 3. The thyristors are controlled by a control pulse device 11, for example in the form of a monostable switch with variable resetting time, the length of which is controlled by a regulator with respect to a certain average current in the load 9.

The capacitor 6 is assumed to be charged with positive polarity on its upper half. As long as the main thyristor 1 is conducting, direct current will flow through the reactor 5, thyristor 1 and load 9. When the auxiliary thyristor 3 ignites, the capacitor 6 will discharge over the reactor 5 and the thyristor 3 and, because of the cooperation between reactor and capacitor, thereafter will be recharged with positive polarity on the lower half by a current through the closed circuit 6, 5, 3. The recharging is saturated at the latest when the voltage over the capacitor has reached approximately the same numerical value as before ignition of thyristor 3.

Thereafter a new discharging of the capacitor will take place by a discharge current through the circuit comprising the diode 4, the main thyristor 1 and the reactor 5. This is possible as long as the main current through the thyristor 1 is greater than said discharge current. When the discharge current, however, reaches the same value as the main current, the resultant current in the thyristor 1 becomes zero and this thyristor is blocked. When this happens the main thyristor becomes currentless and is extinguished. The current through the load (which is assumed to be inductive) continues to flow through capacitor 6 and diode 4 until 6 is completely recharged (to the polarity it had before the extinguishing process was initiated). Then the current through the load 9 commutates from 4 to the bypass diode 2.

When, after that, the control pulse pulse device 11 (which may be of the type shown in the application of Vilmos Torok, Ser. No. 737,736, filed June 17, 1968, U.S. Pat. No. 3,525,032) again ignites the main thyristor 1, the load current will grow up through the reactor 5, thyristor 1 and the load 9, and since the control pulse device 11 because of its regulator, not shown, alternately ignites the thyristors 1 and 3 with variable intervals, the conducting intervals of the main thyristor can be varied in relation to the blocking intervals and the average value of the load current thus also varies.

During the conducting intervals of the thyristor 1, the capacitor 6 is charged with positive polarity on its upper half and is prevented by the diode 4 from discharging itself over the thyristor 1, as the conducting direction of diode 4 is opposite to the direction of a discharge current over thyristor 1 at this polarity of the capacitor voltage.

From the above, it is clear that all currents which grow up through either of the thyristors 1 or 3 also pass through the reactor 5, which thus always protects the thyristors against dangerous current derivatives.

The connection may be provided with a resistor 7, alone or in series with a diode 8. The diode is used in consideration of possible inductance in the supply conductors which will give a certain overcharge of condenser 6 in each period. If the diode 8 were not present, this overcharge would be discharged over the feeding voltage, which is unnecessary and thus would give an unnecessary loss.

It can also be seen that the connection diagram in the drawing can be inverted by inverting the poles of the feeding voltage and inverting the thyristors 1 and 3 and the diodes 2, 4 and 8. This makes no difference in principle in the system.

FIG. 2 shows a connection in which both the main thyristor 1 and the auxiliary thyristor 3 are duplicated as 1a and b and 3a and b, respectively and where the reactor 5 is divided into several parallel windings 5a–d having good mutual inductive connection. Each winding is in series with a main or an auxiliary thyristor. The connection is equivalent electrically to that shown previously, but the division of the reactor 5 facilitates parallel-connection of several main and auxiliary thyristors.

I claim:

1. Direct current converter for DC supply of a load, comprising a main thyristor means and an extinguishing circuit for the main thyristor means comprising an oscillating circuit having an auxiliary thyristor means therein, means connecting said main thyristor means and said auxiliary thyristor means in parallel to each other and in series relationship to said load, said oscillating circuit including a reactor means and a capacitor, the reactor means being connected so that its inductance is mutual for the load current through the main thyristor means and the recharging current of the capacitor in the oscillating circuit through the auxiliary thyristor means, and a control means for alternative ignition of the main thyristor means and the auxiliary thyristor means.

2. Direct current converter according to claim 1, said reactor being connected in series with both the main and the auxiliary thyristor means and said capacitor being connected in parallel with the series-connection of the reactor and the thyristor means.

3. Direct current converter according to claim 1, in which said reactor means comprises individual windings in series each with one of said thyristor means, the windings being mutually inductively closely connected.

* * * * *